United States Patent
Cronje et al.

(10) Patent No.: US 9,275,761 B2
(45) Date of Patent: Mar. 1, 2016

(54) SMALL MODULAR REACTOR SAFETY SYSTEMS

(75) Inventors: Johan M. Cronje, Monumentpark (ZA); Alexander W. Harkness, Gibsonia, PA (US); William Edward Cummins, Pittsburgh, PA (US); Matthew J. Memmott, Pittsburgh, PA (US); Matthew C. Smith, Manor, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 218 days.

(21) Appl. No.: 13/495,083

(22) Filed: Jun. 13, 2012

(65) Prior Publication Data
US 2013/0336441 A1   Dec. 19, 2013

(51) Int. Cl.
G21C 9/00 (2006.01)
G21C 1/32 (2006.01)
G21C 15/18 (2006.01)
G21C 15/26 (2006.01)

(52) U.S. Cl.
CPC ............... *G21C 1/322* (2013.01); *G21C 15/18* (2013.01); *G21C 15/26* (2013.01); *Y02E 30/32* (2013.01)

(58) Field of Classification Search
CPC .................................. G21C 15/18; G21C 1/32
USPC ......................................................... 376/406
See application file for complete search history.

(56) References Cited

U.S. PATENT DOCUMENTS

| | | | | |
|---|---|---|---|---|
| 4,753,771 | A * | 6/1988 | Conway et al. | 376/282 |
| 5,011,652 | A * | 4/1991 | Tominaga et al. | 376/283 |
| 5,102,616 | A * | 4/1992 | Gardner et al. | 376/282 |
| 6,795,518 | B1 * | 9/2004 | Conway et al. | 376/283 |
| 8,867,690 | B2 * | 10/2014 | Watson et al. | 376/273 |
| 2009/0129530 | A1 | 5/2009 | Reyes, Jr. et al. | |
| 2009/0129531 | A1 * | 5/2009 | Reyes et al. | 376/299 |
| 2009/0161812 | A1 | 6/2009 | Reyes, Jr. et al. | |
| 2012/0121056 | A1 | 5/2012 | Sato et al. | |

OTHER PUBLICATIONS

NRC Reactor Core Isolation Cooling System.*
Steam Drums—mechanical steam-water separators.*
International Search Report dated Oct. 8, 2013 for PCT/US2013/043551 (Form PCT/ISA/210).
Written Opinion of the International Searching Authority for PCT/US2013/043551 (Form PCT/ISA/237).

(Continued)

*Primary Examiner* — Jack W Keith
*Assistant Examiner* — Sharon M Davis
(74) *Attorney, Agent, or Firm* — Joseph C. Spadacene; Westinghouse Electric Company LLC

(57) ABSTRACT

An integral pressurized water reactor that combines all of the components typically associated with a nuclear steam supply system, such as the steam generator, reactor coolant pumps, pressurizer and the reactor, into a single reactor pressure vessel. The reactor pressure vessel is itself enclosed in a containment pressure vessel that also houses a number of safety systems, such as the core make-up tanks, the primary side of residual heat removal heat exchangers, an automatic depressurization system and a recirculation system that enables continuous core cooling through natural circulation over an extended period of time. Actuation of the passive systems is done by single actuation of valves, powered from redundant batteries.

18 Claims, 5 Drawing Sheets

(56) References Cited

OTHER PUBLICATIONS

Shulyak, N., Westinghouse Small Modular Reactor: Taking Proven Technology to the Next Level, IAEA INPRO Dialogue Forum on Nuclear Energy Innovations: Common User Considerations for Small and Medium-sized Nuclear Power Reactors. 3d Vienna, Austria. Oct. 2011 (entire document).

Smith, M. et al., Westinghouse Small Modular Reactor Passive Safety System Response to Postulated Events. ICAPP '12 Proceedings Jun. 24-28, 2012.

International Preliminary Report on Patentability dated Dec. 24, 2014 for PCT/US2013/043551 (Forms PCT/IB/323, PCT/IB/373, PCT/ISA/237).

* cited by examiner

SMALL MODULAR REACTOR SAFETY SYSTEMS

CROSS REFERENCE TO RELATED APPLICATIONS

This application is related to U.S. patent application Ser. No. 13/495,069, filed concurrently herewith.

BACKGROUND

1. Field

This invention pertains generally to small modular pressurized water reactors and, more particularly, to a system for passively cooling a small modular reactor after the reactor has been tripped.

2. Related Art

In a nuclear reactor for power generation, such as a pressurized water reactor, heat is generated by fission of a nuclear fuel such as enriched uranium, and transferred into a coolant flowing through a reactor core. The core contains elongated nuclear fuel rods mounted in proximity with one another in a fuel assembly structure, through and over which the coolant flows. The fuel rods are spaced from one another in co-extensive parallel arrays. Some of the neutrons and other atomic particles released during nuclear decay of the fuel atoms in a given fuel rod pass through the spaces between fuel rods and impinge on fissile material in adjacent fuel rods, contributing to the nuclear reaction and to the heat generated by the core.

Movable control rods are dispersed throughout the nuclear core to enable control of the overall rate of the fission reaction, by absorbing a portion of the neutrons, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to fission in an adjacent fuel rod; and retracting the control rods reduces the extent of neutron absorption and increases the rate of a nuclear reaction and the power output of the core.

FIG. 1 shows a simplified conventional nuclear reactor primary system, including a generally cylindrical pressure vessel 10 having a closure head 12 enclosing a nuclear core 14 that supports the fuel rods containing the fissile material. A liquid coolant, such as water or borated water, is pumped into the vessel 10 by pump 16 through the core 14 where heat energy is absorbed and is discharged to a heat exchanger 18 typically referred to as a steam generator, in which heat is transferred to a utilization circuit (not shown) such as a steam driven turbine generator. The reactor coolant is then returned to the pump 16 completing the primary loop. Typically, a plurality of the above described loops are connected to a single reactor vessel 10 by reactor coolant piping 20.

Commercial power plants employing this design are typically on the order of 1,100 megawatts or more. More recently, Westinghouse Electric Company LLC has proposed a small modular reactor in the 200 megawatt class. The small modular reactor is an integral pressurized water reactor with all primary loop components located inside the reactor vessel. The reactor vessel is surrounded by a compact, high pressure containment. Due to both the limited spaced within the containment and the low cost requirement for integral pressurized light water reactors, the overall number of auxiliary systems needs to be minimized without compromising safety or functionality. For that reason, it is desirable to maintain most of the components in fluid communication with the primary loop of the reactor system within the compact, high pressure containment.

Typical conventional pressurized water reactor designs make use of active safety systems that rely on emergency AC power after an accident to power the pumps required to cool down the reactor and spent fuel pool. Advanced designs, like the AP1000®, offered by Westinghouse Electric Company LLC, make use of passive safety systems that only rely on natural circulation, boiling and condensation to remove the decay heat from the core and spent fuel pool. It is desirable to apply these passive safety system principals to a small modular reactor design and preferably simplify the design, while still maintaining the safety margins.

Accordingly, it is an object of this invention to provide a passive safety system for a small modular reactor that can identify the occurrence of a loss of coolant accident or a main steam line break and initiate a series of events within a pressurized containment of the small modular reactor to cool the reactor over an extended period of approximately five to seven days without outside intervention.

It is a further object of this invention to provide such a passive safety system that has a simplified design, which consolidates components over that previously employed in advanced larger reactor designs.

SUMMARY

These and other objects are achieved by a modular nuclear reactor system having a reactor pressure vessel with a removable head; a primary coolant loop of a nuclear reactor enclosed within the reactor pressure vessel; and a containment pressure vessel enclosing the reactor pressure vessel, with the containment pressure vessel being substantially submerged in a liquid pool.

In one embodiment, the modular nuclear reactor system includes an in-containment pool system comprising a sump for collecting reactor coolant escaping from the primary system. The in-containment pool system is located within the containment pressure vessel outside of the reactor pressure vessel and includes means for passively recirculating reactor coolant within the in-containment pool system and the sump into the reactor pressure vessel in the unlikely event of a loss of coolant accident. Preferably, the in-containment pool system is connected to a cold leg of the primary coolant loop through a check valve. The in-containment pool system may further include an in-containment reservoir of reactor coolant which is connected to the sump by check valves which open automatically when the sump level is higher than the water level in the in-containment pool system. Desirably, the modular nuclear reactor system includes a depressurization system to equalize the pressure within the reactor pressure vessel and the containment pressure vessel to facilitate the passive recirculation of reactor coolant during the unlikely event of a loss of coolant accident. Preferably, the depressurization system is connected to the hot leg of the primary coolant loop. The in-containment pool system may further include one or more in-containment pool tanks containing reactor coolant, which are supported at an elevation above a reactor core within the reactor pressure vessel, wherein the in-containment tanks are connected in fluid communication with the in-containment reservoir.

The modular nuclear reactor system may also include one or more core make-up tanks containing reactor coolant at a pressure substantially equal to the pressure within the reactor pressure vessel. The core make-up tanks are desirably supported within the containment pressure vessel at an elevation above the reactor core and are connected at an upper portion of the core make-up tanks to a hot leg of the primary coolant loop and at a lower portion of the core make-up tanks to a cold leg of the primary coolant loop with an isolation valve between the lower portion of the core make-up tanks and the cold leg to isolate the lower portion from the cold leg of the primary coolant loop during normal reactor operation. A second depressurization subsystem is connected to the top of the core makeup tanks.

A modular nuclear reactor system may also include a passive residual heat removal system for cooling the reactor coolant within the core make-up tanks when the isolation valve is in an open condition. Preferably, the passive heat removal system has a first heat exchanger with a primary side and a secondary side. The primary side of the first heat exchanger is in fluid communication with the reactor coolant in the core make-up tank and the secondary side of the first heat exchanger is in fluid communication with a primary side of a second heat exchanger having a secondary side in fluid communication with an ultimate heat sink pool; with the ultimate heat sink pool extending to an elevation above the containment pressure vessel. In one embodiment, the ultimate heat sink pool is in fluid communication with means for replenishing the liquid pool that the containment pressure vessel is substantially submerged in, when the liquid in the pool drops below a preselected level.

A modular nuclear reactor system may also include a protection and safety monitoring system which is configured to monitor the occurrence of any design basis event including a loss of coolant accident or a steam line break and upon such occurrence issue a control signal to open the isolation valve associated with the core make-up tanks. The protection and safety monitoring system may additionally monitor the reactor coolant level within the core make-up tanks and when the reactor coolant within the core make-up tanks goes below a pre-selected level, the protection and safety monitoring system issues a control signal to activate the depressurization system. Desirably, activation of the depressurization system also activates vent valves on the in-containment pool tanks that vent an interior of the in-containment pool tanks to the interior of the containment pressure vessel. The in-containment pool tanks are configured to drain into the core through the in-containment reservoir when the pressure in the reactor pressure vessel substantially equals the pressure in the containment pressure vessel.

In still another embodiment, the reactor pressure vessel includes a steam generator heat exchanger having a primary side as part of the primary coolant loop of the nuclear reactor and a secondary side connected in a closed loop with a steam drum located outside of the containment pressure vessel. The secondary side of the steam generator heat exchanger has steam generator isolation valves for isolating the secondary side of the steam generator heat exchanger from the steam drum. The protection and safety monitoring system is additionally configured to monitor for a primary or secondary side break and when the break is detected, the protection and safety monitoring system issues a safeguards signal to the steam generator isolation valves that isolate the steam generator heat exchanger from the steam drum in response to the safeguards signal.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
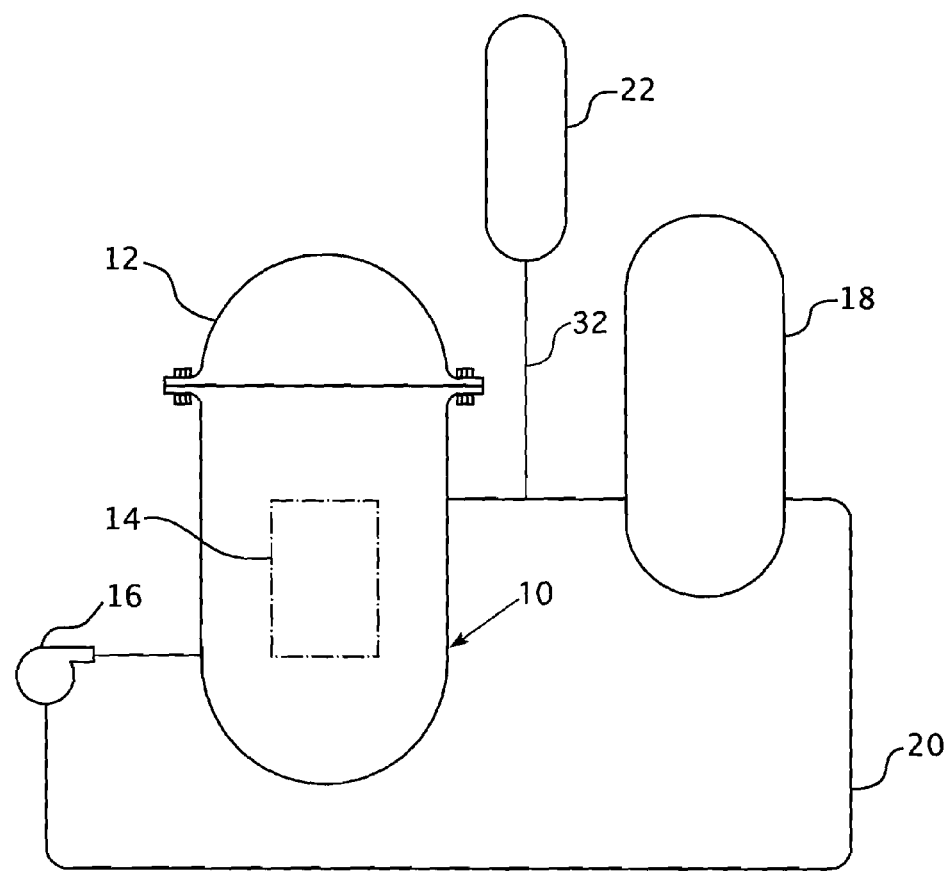
FIG. 1 is a simplified schematic of a conventional nuclear reactor system.
Figure 2:
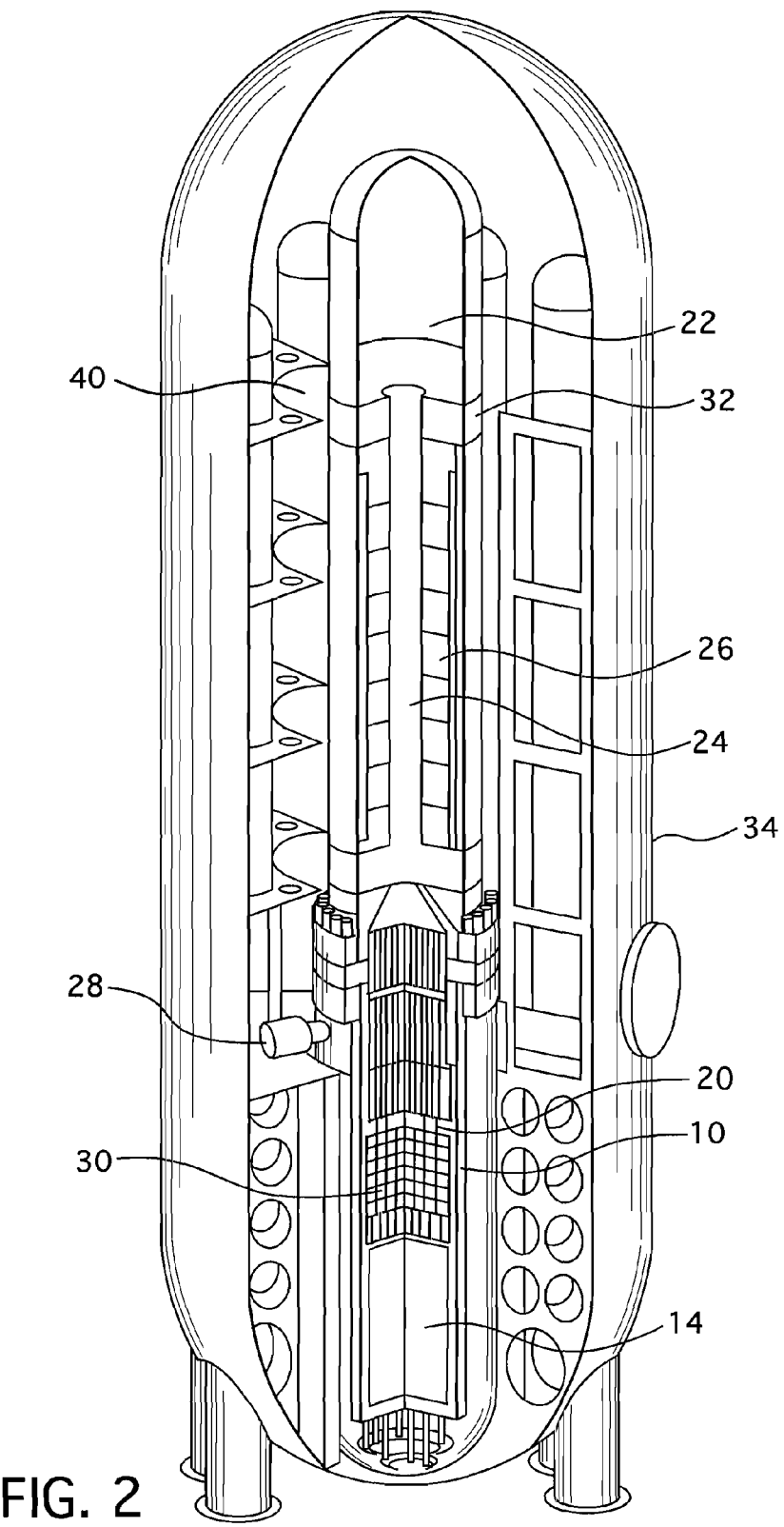
FIG. 2 is a perspective view, partially cut away, showing a small modular integral reactor system incorporating one embodiment of this invention.
Figure 3:
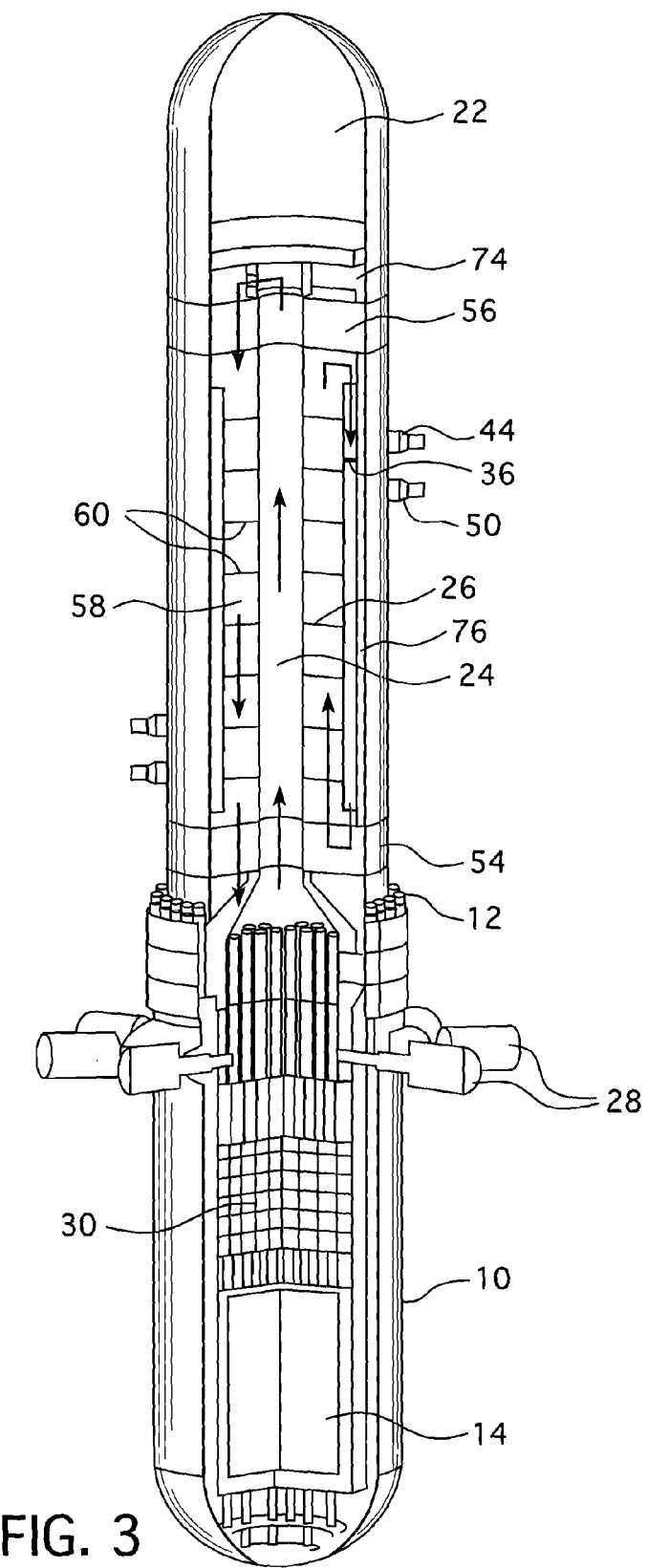
FIG. 3 is an enlarged view of the reactor shown in FIG. 2.
Figure 4:
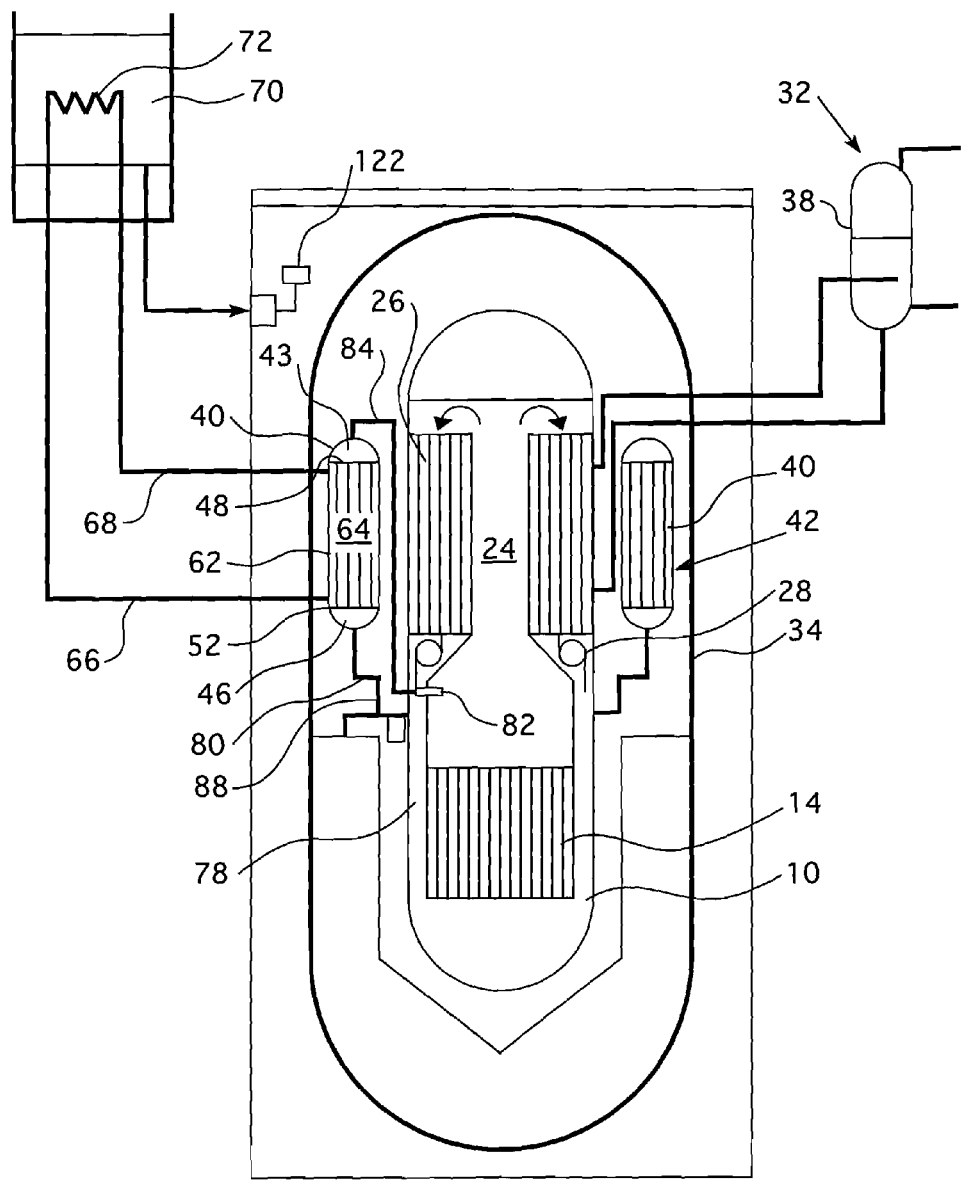
FIG. 4 is a schematic view of the reactor containment shown in FIG. 2, which supports an understanding of the operation of the core make-up tanks including the operation of the outside reactor containment components of the combined passive residual heat removal system and high head water injection system of one embodiment of the passive safety systems of this invention and the outside containment steam drum portion of the steam generator.
Figure 5:
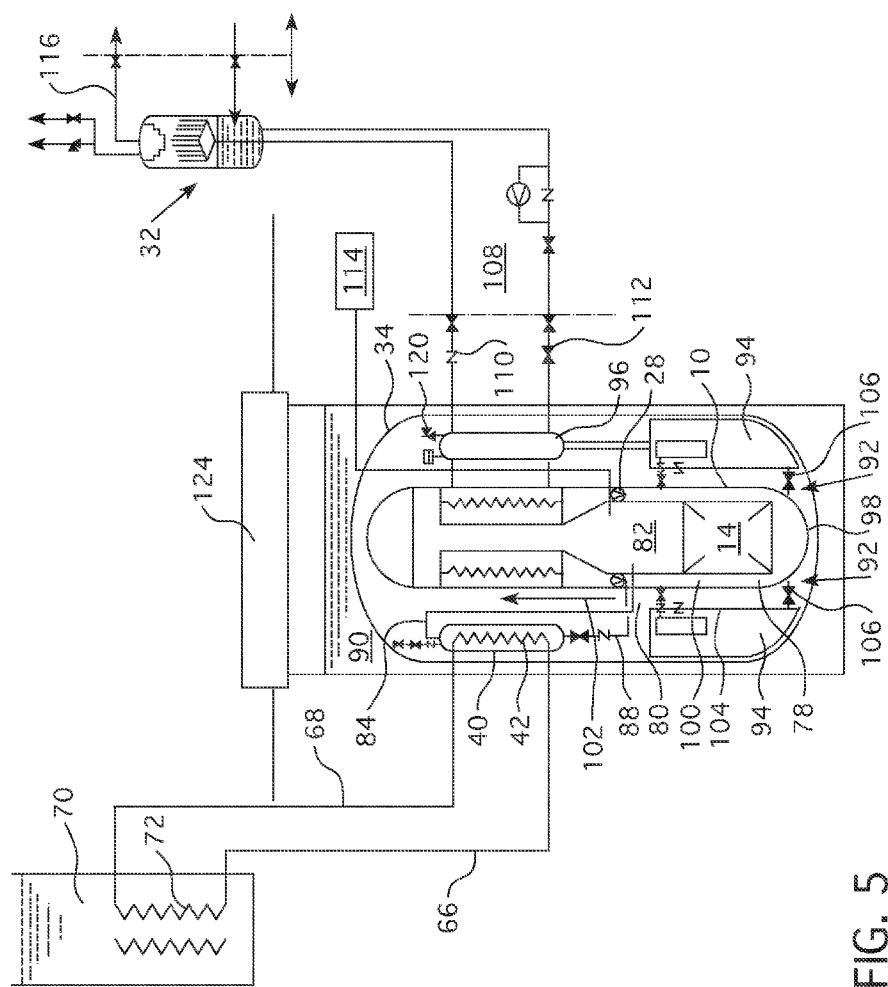
FIG. 5 is a schematic view of another embodiment of this invention which incorporates the operation of the core make-up tanks and residual heat removal system in combination with an in-containment pool system for recirculating reactor coolant that has escaped from the reactor pressure vessel into the containment pressure vessel.

FIGS. 2, 3, 4 and 5 illustrate a small modular reactor design which can benefit from the passive heat removal system, high head water injection system and recirculation system claimed hereafter. FIG. 2 shows a perspective view of the reactor containment of a modular reactor design to which this invention can be applied. The reactor containment illustrated in FIG. 2 is partially cut away, to show the reactor pressure vessel and its integral, internal components. FIG. 3 is an enlarged view of the reactor pressure vessel shown in FIG. 2. FIG. 4 is a schematic view of one embodiment of the reactor and some of the reactor auxiliary systems, including an ultimate heat sink and secondary heat exchange loop of the combined passive heat removal system and high head water injection system of one embodiment of this invention. FIG. 5 is a schematic view of another embodiment of the passive safety system of this invention, which includes the major components of the extended passive core cooling and coolant recirculation system of this invention. Like reference characters are used among the several figures to identify corresponding components.

In an integral pressurized water reactor such as illustrated in FIGS. 2, 3, 4 and 5, substantially all of the components typically associated with the primary side of a nuclear steam supply system are contained in a single reactor pressure vessel 10 that is typically housed within a high pressure containment vessel 34 capable of withstanding pressures of approximately 250 psig, along with portions of the safety systems associated with the primary side of the nuclear steam supply system. The primary components housed within the reactor pressure vessel 10 include the primary side of a steam generator, reactor coolant pumps 28, a pressurizer 22 and the reactor itself. The steam generator system 18 of a commercial reactor, in this integral reactor design, is separated into two components, a heat exchanger 26 which is located in the reactor vessel 10 above the reactor upper internals 30 and a steam drum 32 which is maintained external to the containment 34 as shown in FIGS. 4 and 5. The steam generator heat exchanger 26 includes within the pressure vessel 10/12, which is rated for primary design pressure and is shared with the reactor core 14 and other conventional reactor internal components, two tube sheets 54 and 56, hot leg piping 24 (also referred to as the hot leg riser), heat transfer tubes 58 which extend between the lower tube sheet 54 and the upper tube sheet 56, tube supports 60, secondary flow baffles 36 for directing the flow of the secondary fluid medium among the heat transfer tubes 58 and secondary side flow nozzles 44 and 50.

The heat exchanger 26 within the pressure vessel head assembly 12 is thus sealed within the containment 34. The external-to-containment steam drum 32 is comprised of a pressure vessel 38, rated for secondary design pressure. The external-to-containment steam drum 32 includes centrifugal type and chevron type moisture separation equipment, a feed water distribution device and flow nozzles for dry steam, feed water, recirculating liquid and wet steam, much as is found in a conventional steam generator design 18.

The flow of the primary reactor coolant through the heat exchanger 26 in the head 12 of the vessel 10 is shown by the arrows in the upper portion of FIG. 3. As shown, heated reactor coolant exiting the reactor core 14 travels up and through the hot riser leg 24, through the center of the upper tube sheet 56 where it enters a hot leg manifold 74 where the heated coolant makes a 180° turn and enters the heat transfer tubes 58 which extend through the upper tube sheet 56. The reactor coolant then travels down through the heat transfer tubes 58 that extend through the lower tube sheet 54 transferring its heat to a mixture of recirculated liquid and feedwater that is entering the heat exchanger through the sub-cooled recirculation input nozzle 50 from the external steam drum 32, in a counterflow relationship. The sub-cooled recirculating liquid and feedwater that enters the heat exchanger 26 through the sub-cooled recirculation input nozzle 50 is directed down to the bottom of the heat exchanger by the secondary flow baffles 36 and up and around heat exchange tubes 58 and turns just below the upper tube sheet 56 into an outlet channel 76 where the moisture-laden steam is funneled to the wet steam outlet nozzle 44. The wet saturated steam is then conveyed to the external steam drum 32 where it is transported through moisture separators which separate the steam from the moisture. The separated moisture forms the recirculated liquid which is combined with feedwater and conveyed back to the sub-cooled recirculation input nozzle 50 to repeat the cycle.

Both conventional pressurized water reactor designs and advanced pressurized water reactor designs (such as the AP1000® offered by the Westinghouse Electric Company LLC, Cranberry Township, Pa.) make use of both decay heat removal systems and high head injection systems to prevent core damage during accident scenarios. In the Westinghouse small modular reactor design, illustrated in FIGS. 2, 3, 4 and 5, cost and space constraints limit the capability of these systems as currently implemented in the larger pressurized water reactors. This invention combines the passive decay heat removal, high head water injection and recirculation functions into a single, simple, integrated system. This combined safety system greatly simplifies the integral reactor design as compared to the larger pressurized water reactor safety systems, and allows for comparable reactor protection capabilities during accidents at a decreased cost and with lower spatial requirements. The embodiment of the invention claimed hereafter which is described herein includes a novel recirculation system design that can continuously cool the reactor core for approximately seven days without operator action or the use of external power. The initial passive cooling time may be further extended by replenishing the water in an ultimate heat sink pool outside the containment as will be described hereafter.

As can be viewed from FIGS. 2-5, the safety system of this invention includes three basic functions: a high head water injection function in which water under pressure is forced into the core in a recirculation loop through the core make-up tank; a residual heat removal system which cools the reactor coolant circulating through the core make-up tank; and a core recirculation system that continually recirculates coolant through the core. The combined high head water injection function and residual passive heat removal function can be understood by referring to FIGS. 2-4, which show a combined core make-up tank/passive residual heat removal heat exchanger 40/42 located within the containment vessel 34, with the passive residual heat removal heat exchanger 42 located within the core make-up tank 40. The passive residual heat removal heat exchanger 42 includes an inlet plenum 43 at the top end of the core make-up tank and an outlet plenum 46 at the lower end of the core make-up tank. An upper tube sheet 48 separates the upper inlet plenum 43 from a secondary fluid plenum 64 and a lower tube sheet 52 separates the lower outlet plenum 46 from the secondary fluid plenum 64. A tube bundle 62 of heat exchange tubes extends between the upper tube sheet 48 and the lower tube sheet 52. Accordingly, primary fluid from the hot leg of the core 82, supplied through the inlet piping 84 enters the inlet plenum 43, is conveyed through the tube bundle 62 to the outlet plenum 46 and is returned to the cold leg 78 of the core 14 through the outlet piping 88. The coolant passing through the tube bundle 62 transfers its heat to a secondary fluid in the secondary fluid plenum 64 between the tube sheets 48 and 52. A secondary fluid enters the secondary fluid plenum 64 through the secondary fluid inlet piping 66, absorbs the transferred heat from the tube bundle 62 and exits through the secondary fluid outlet piping 68. The height of the core make-up tank 40, i.e., the elevation at which the core make-up tank is supported, is maximized in order to facilitate high natural circulation flows. During steady state operation, the core make-up tank 40 and the primary tube side of the passive residual heat removal heat exchanger 42 is filled with cold, borated water at the same pressure as the reactor coolant. This water is prevented from flowing into the reactor pressure vessel 40 by a valve 80 on the exit piping 88 on the bottom of the core make-up tank 40.

During accident conditions, the reactor protection and safety monitoring system signals the opening of the valve 80, allowing the cold, borated core make-up tank water to flow down through the exit piping 88 and into the cold leg 78 of the reactor pressure vessel 10. Concurrently, hot reactor coolant then flows from the core exit region 82 into the core make-up tank 40 through the inlet piping 84, and then into the core make-up tank inlet plenum 43. The hot reactor water then flows down through the tubes within the tube bundle 62 of the passive residual heat removal heat exchanger 42, and is cooled by cold secondary water flowing through the shell side of the passive residual heat removal heat exchanger in the secondary fluid plenum 64.

The secondary water which is pressurized to prevent boiling, then flows upward through piping 68 to a second heat exchanger 72 in the ultimate heat sink tank 70, where it transfers heat to the cold water in the tank 70. The now cooled secondary water flows down through the return piping 66, and into the core make-up tank shell side 64 of the heat exchanger 42 to repeat the process. Both the ultimate heat sink loop and the core make-up tank primary loop are driven by natural circulation flows. The core make-up tank primary loop flow continues to remove heat from the reactor even after steam enters the core make-up tank inlet piping 84.

During an accident in which coolant is lost from the reactor pressure vessel 10, the water level in the reactor vessel drops as the passive residual heat removal heat exchanger 42 removes decay heat from the reactor 10. When the water level drops below the core make-up tank inlet piping entrance at the core exit region 82, steam enters the inlet piping and breaks the natural circulation cycle. At this point, the inventory of the core make-up tank (excluding the secondary shell side 64 of the passive residual heat removal heat exchanger) flows downward through the outlet piping under the steam pressure and into the reactor pressure vessel cold leg 78, effectively serving as a high head injection. This combined high head injection from the core make-up tank and residual heat removal heat exchanger combination is more fully described in application Ser. No. 13/495,069, filed concurrently herewith.

The embodiment illustrated in FIG. 5 combines the features of the combined core make-up tank high head injection and residual heat removal system with an in-containment reactor recirculation system that provides core cooling, without outside power, over an extended period.

In one preferred embodiment of the small modular reactor safety system, illustrated in FIG. 5, the integral reactor vessel 10 is inside a small high pressure containment vessel 34 as previously mentioned with regard to FIG. 4. The containment vessel 34 is substantially submerged in a pool of water 90 to provide external cooling to the vessel. Inside the vessel is an in-containment pool system 92 that comprises in-containment pool reservoirs 94 connected to in-containment pool tanks 96 located at an elevation above the reactor core 14. The in-containment pool reservoir 94 is split in two halves, each connected to one in-containment pool tank 96. The core make-up tanks 40, of which there can be one or more, are also located inside the containment, as previously mentioned, at an elevation above the core. The top of each core make-up tank is coupled to the hot leg at the core exit region 82 of the reactor vessel above the core 14, while the bottom of the core make-up tank is connected to the direct vessel injection nozzle 100 in the cold leg of the reactor primary coolant loop downstream of the reactor coolant pumps 28. Residual heat removal heat exchangers 42 are included within the core make-up tanks 40 to conduct heat out of the system as heretofore described. The primary side of the residual heat removal heat exchangers are coupled to the core exit region 82 and cold leg 78 of the reactor pressure vessel 10. The residual heat removal heat exchanger secondary side is connected to heat exchangers in the ultimate heat sink pools 70. The ultimate heat sink pools 70 are placed at a higher elevation than the containment 34. This secondary side cooling loop of the residual heat removal system heat exchangers is pressurized using accumulators.

Automatic depressurization system valves 102 are connected to independent lines to the hot leg 82 of the reactor vessel 10. A second set of depressurization valves is connected to the top of each core makeup tank. The purpose of these valves is to depressurize the reactor and equalize the pressure between the containment volume and the reactor vessel volume. This is necessary to recirculate water into the reactor from the containment pressure vessel under gravity. On each core make-up tank cold leg 88, a normally closed, fail open valve 80 prevents flow through the core make-up tank during normal operation. After an accident, these valves will open to allow cold, borated water that is inside the core make-up tank during normal operation to flow into the reactor through natural circulation. This natural circulation is initiated by the temperature difference between the hot leg connection line and the cold borated water initially in the core make-up tank during normal operation. It should be noted that the core make-up tank, i.e., the primary side of the residual heat removal heat exchanger 42, is pressurized to a level substantially equal to that encountered within the reactor vessel 10. The recirculation of coolant through the core is sustained by the cooling of the water that flows into the core make-up tank primary side by the secondary natural circulation loop of the residual heat removal heat exchanger that is cooled by the ultimate heat sink pool 70. Flow through the secondary loop of the residual heat removal heat exchanger is initiated by heating of the secondary water inside the core make-up tank and sustained by the cooling of the secondary water in the ultimate heat sink heat exchanger.

The in-containment pool system 92 is connected through the in-containment pool reservoirs 94 to sump injection nozzles through check valves 104. The check valves allow flow from the in-containment pool system through the in-containment pool reservoirs 94 to the reactor coolant system. The in-containment pool system 92 is also connected to a lower portion of the containment interior volume or containment sump 98 through check valves and normally closed, in-vessel retention valves 106. The check valves allow flow from the containment sump 98 to the in-containment pool system 92. The in-vessel retention valves 106 allow the water in the in-containment pool system 92 to flow into the reactor vessel cavity and cool the exterior of the reactor vessel preventing the core from melting through the reactor vessel wall.

The steam generator secondary side 108 is connected to an external steam drum 32 that separates the wet steam coming from the steam generator heat exchanger into dry steam and water. The heat removal capability of the water in the steam drum may also be used after an accident. The operation of the steam generator is more fully described in application Ser. No. 13/495,050, filed concurrently herewith. The steam drum 32 can be isolated by closing off the isolation valves 110 and 112.

The operation of the safety system can be demonstrated through a review of the sequence of events that will occur following a postulated loss of coolant accident. A loss of coolant accident occurs when a primary pipe breaks inside the containment. As there are no large primary pipes in an integral reactor, the primary pipe break will be on auxiliary connections to the reactor like the pressurizer spray line on the pressurizer 22 or the connections to the core make-up tanks 40. These lines will be limited in diameter to under six inches.

The first step in a loss of coolant accident sequence is the diagnosis by the protection and safety monitoring system 114 that an event is in progress. The protection and safety monitoring system then generates a protection system signal which results in the insertion of the control rods into the core 14 and a trip of the reactor coolant pumps 28. The steam drum 32 will be isolated from the turbine by closing off the main steam line 116 and the feedwater recirculation line from the steam drum to the Steam Generator.

The second step is opening the valves 80 below the core make-up tanks 40 which results in the cold, borated water in the core make-up tanks being forced into the core, cooling it and keeping the core covered. The residual heat removal heat exchangers are also activated, and this initiates the natural circulation cooling flow from the hot leg, through the heat exchanger and into the cold leg. The secondary side cooling loop of the residual heat removal heat exchangers will transfer the heat to the ultimate heat sink pools 70. This cooling will continue until the water level in the reactor has dropped below the hot leg residual heat removal inlet connections in the reactor vessel 10. At this point, the water in the core makeup tanks starts to drain into the cold leg.

A low water level in the core make-up tanks or another actuation signal will actuate the automatic depressurization system valves 102, equalizing the pressure between the reactor volume and the containment volume. As soon as the pressure in the reactor is low enough, the in-containment pool tanks 96 (only one of which is shown) will drain into the reactor under gravity through the in-containment pool reservoirs 94 and the check valves 106. The vent valves 120 on the in-containment pool tanks 96 will open with the automatic depressurization system valves 102 permitting the tanks to drain. The water in the in-containment pool tanks 96 will replenish the water in the core, keeping the core covered as the water in the reactor boils off, releasing steam into the containment 34 through the automatic depressurization system valves 102.

The steam inside the containment 34 then condenses on the cold containment vessel, which is submerged in the water pool 90 which is covered by a vented removable radiation shield 124. The condensed steam will collect in the bottom of the containment in the sump 98, with the water level rising as more steam is condensed on the cold containment vessel wall. When the water level in the in-containment pool tanks 96 reaches a sufficient level, check valves will open allowing the water inside the containment to flow from the sump 98 into the in-containment pool reservoirs 94 and back into the reactor through sump injection nozzles 100. This creates a continuous cooling loop with water in the reactor boiling off and the steam released into the containment through the automatic depressurization system valves 102. The steam condensate then flows back into the reactor through the in-containment pool system 90 under natural circulation. Through this process, the decay heat is transferred from the core to the water outside the containment 34. The water pool 90 outside the containment may boil off but can be replenished from the ultimate heat sink pool 70 through float valves 122. The combined water in the ultimate heat sink pools 70 and outside containment pool 90 is sufficient to cool the reactor for at least seven days. After that, either the ultimate heat sink water should be replenished via connections in the ultimate heat sink pools that allow for the addition of inventory to extend the cooling operation, or AC power should be restored to cool the ultimate heat sink pools.

The postulated main steam line break inside the containment event makes use of additional features of the safety systems of the embodiments described herein. In this case, the protection and safety monitoring systems will diagnose that a main steam line break event is in progress and send a signal to isolate the steam drum 32 from the containment 34 by closing the steam drum isolation valves 110 and 112, preventing the steam drum water inventory from entering the containment or interacting with the steam generator tubes within the reactor vessel head 12. A reactor trip signal will also be generated, if the reactor is operating at power. The valves 80 below the core make-up tanks will then be opened, starting the delivery of borated water to the core 14. Any reactivity excursion will be terminated by the delivery of borated water to the core. The decay heat will be transferred by way of the residual heat removal heat exchangers 42 to the ultimate heat sink pools 70, which will increase in temperature until they boil. The volume of the ultimate heat sink pools is enough to cool the reactor for at least seven days. After that, either the ultimate heat sink water should be replenished or AC power should be restored to cool the ultimate heat sink pools. The protection and safety monitoring system 114, the in-vessel retention valves 106, the steam drum isolation valves 110, 112, the in-container pool tank vent valves 120, the automatic depressurization valves, and the core make-up tank isolation valve do not rely on the availability of AC power.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A modular nuclear reactor system comprising;
a reactor pressure vessel having a removable head;
a primary coolant loop of the nuclear reactor enclosed within the reactor pressure vessel for circulating a primary coolant within the reactor pressure vessel;
a containment pressure vessel enclosing the reactor pressure vessel, the containment pressure vessel being substantially submerged in a liquid pool;
an in-containment pool system located within the containment pressure vessel, outside of the reactor pressure vessel and at least in part occupying a lower portion of the containment pressure vessel below an upper elevation of a reactor core housed within the reactor pressure vessel, the in-containment pool system having a reserve reservoir of the primary coolant that is isolated from the primary coolant loop during normal reactor operation, with the reserve reservoir connected to an inlet to the reactor pressure vessel;
a sump, normally isolated from the in-containment pool system, at least in part extending into a lower portion of the containment pressure vessel, for collecting the primary coolant escaping out of the primary coolant loop and into the containment pressure vessel; and
a circulation system configured to passively circulate, by natural circulation by convection, the primary coolant from the sump through at least a portion of the in-containment pool system and into the reactor pressure vessel upon a preselected operating condition of the modular reactor system.

2. The modular nuclear reactor system of claim 1 wherein the in-containment pool system is connected to a cold leg of the primary coolant loop through a check valve.

3. The modular nuclear reactor system of claim 1 wherein a portion of the in-containment pool system reservoir of the primary coolant is connected to the sump through a sump check valve and a sump injection nozzle that opens a normally closed fluid communication path from the sump to the in-containment pool system reservoir when the reactor pressure vessel is in a depressurized condition and a level of the primary coolant within the sump reaches a given level.

4. The modular nuclear reactor system of claim 3 including a depressurization system for equalizing the pressure within the reactor pressure vessel and the containment pressure vessel.

5. The modular nuclear reactor system of claim 4 including one or more in-containment pool tanks containing reactor coolant wherein the in-containment pool tanks are supported within the containment pressure vessel, outside of the reactor pressure vessel, at an elevation above the reactor core within the reactor pressure vessel, wherein the in-containment pool tanks are connected to and in fluid communication with the reserve reservoir.

6. The modular nuclear reactor system of claim 5 including one or more core makeup tanks containing primary coolant at a pressure substantially equal to a pressure within the reactor pressure vessel during normal reactor operation, the core makeup tanks being supported within the containment pressure vessel outside of the reactor pressure vessel, at an elevation above the reactor core and being connected at an upper portion of the core makeup tanks to a hot leg of the primary coolant loop and at a lower portion of the core makeup tanks to a cold leg of the primary coolant loop, and an isolation valve for isolating the lower portion of the core makeup tanks from the cold leg of the primary coolant loop.

7. The modular nuclear reactor system of claim 6 including a passive residual heat removal system for cooling the reactor coolant within the core makeup tanks when the isolation valve is in an open condition.

8. The modular nuclear reactor system of claim 7 wherein the passive residual heat removal system has a first heat exchanger with a primary side and a secondary side, the primary side of the first heat exchanger is in fluid communication with the reactor coolant in the core makeup tank and the secondary side of the first heat exchanger is in fluid communication with a primary side of a second heat exchanger having a secondary side in fluid communication with an ultimate heat sink pool, the ultimate heat sink pool extending to an elevation above the containment pressure vessel.

9. The modular nuclear reactor system of claim 8 wherein the ultimate heat sink pool is in fluid communication with means for replenishing the liquid pool when the liquid pool drops below a preset level.

10. The modular nuclear reactor system of claim 6 wherein the depressurization system is connected to the hot leg of the primary coolant loop.

11. The modular nuclear reactor system of claim 10 including a second depressurization system connected to the core makeup tank.

12. The modular nuclear reactor system of claim 6 wherein the depressurization system is connected to the core makeup tank.

13. The modular nuclear reactor system of claim 6 including a protection and safety monitoring system which is configured to monitor the occurrence of a loss of coolant accident or a steam line break and upon such occurrence issue a control signal to open the isolation valve.

14. The modular nuclear reactor system of claim 13 wherein the protection and safety monitoring system is configured to monitor the reactor coolant level within the core makeup tank and when the reactor coolant within the core makeup tank goes below a preselected level the protection and safety monitoring system issues a control signal to activate the depressurization system.

15. The modular nuclear reactor system of claim 14 wherein activation of the depressurization system also activate vent valves on the in-containment pool tanks that vent an interior of the in-containment pool tanks to the containment pressure vessel.

16. The modular nuclear reactor system of claim 15 wherein the in-containment pool tanks are configured to drain into the core through the in-containment pool system reservoir when the pressure in the reactor pressure vessel substantially equals the pressure in the containment pressure vessel and the level of the primary coolant within the reactor pressure vessel drops below a selected level.

17. The modular nuclear reactor system of claim 16 wherein an in-vessel retention valve in the in-containment pool system is configured to be responsive to an electrical signal which is issued under certain adverse operating conditions to open the in-vessel retention valve to allow at least some of the primary coolant within the in-containment pool system to flow around an outside of a lower portion of the reactor pressure vessel when the primary coolant in the in-containment pool tanks drop below a predetermined level and the primary coolant in the sump is above the given level.

18. The modular nuclear reactor system of claim 16 wherein the reactor pressure vessel includes a steam generator heat exchanger having a primary side as part of the primary coolant loop and a secondary side connected in a closed loop with a steam drum located outside of the containment pressure vessel, wherein the secondary side of the steam generator heat exchanger has steam generator isolation valves for isolating the steam generator heat exchanger from the steam drum and wherein the protection and safety monitoring system is configured to monitor for a primary or secondary side break and when a primary or secondary side break is detected the protection and safety monitoring system issues a safeguards signal to the steam generator isolation valves that isolate the steam generator heat exchanger from the steam drum.

* * * * *